Figure 1:
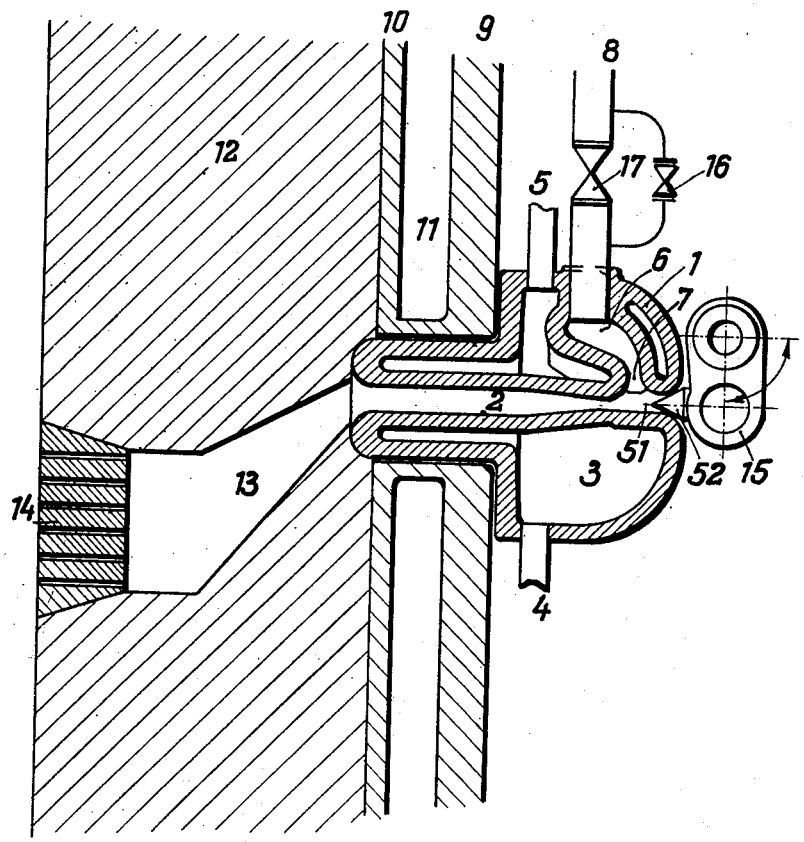

Inventor:
FRIEDRICH WILHELM SIMON DANULAT

UNITED STATES PATENT OFFICE 2,687,347

APPARATUS AND A PROCESS FOR TAPPING LIQUID SLAG FROM PRESSURE GAS PRODUCERS

Friedrich Wilhelm Simon Danulat, Frankfurt am Main Eschersheim, Germany, assignor to Metallgesellschaft Aktiengesellschaft, Frankfurt am Main, Germany, a corporation of Germany Application January 5, 1950, Serial No. 137,006

11 Claims. (Cl. 48—87)

This invention relates to an apparatus and a process for tapping liquid slag from pressure gas producers.

Solid combustibles have already been gasified under pressure of several pounds per square inch as, for example, 300 pounds per square and more with oxygen-enriched air, or oxygen and steam, or carbon dioxide and steam. The residues of the gasification have until now commonly been removed in a solid state from such pressure gas producers by means of rotary grates and periodically operated sluices. Operating with solid slag has the disadvantage that higher temperatures cannot be used and that a great surplus of steam or carbon dioxide has to be used in order to prevent melting or fusing of the residues in the gas producer. But higher reaction temperatures are desirable in many cases if, for example, synthesis gas is to be produced. In this case it is important to produce a gas having as high a content of carbon monoxide and hydrogen as possible and to prevent to the largest possible extent the formation of methane occurring at low reaction temperatures. The consumption of steam and carbon dioxide is also considerably lower with high reaction temperatures. On the other hand, at higher reaction temperatures liquid slag is produced, the removal of which from pressure gas producers has so far been very difficult.

The invention relates to an apparatus and a process overcoming all difficulties connected with the tapping of liquid slag from pressure gas producers. The device for tapping liquid slag according to the invention comprises mainly a tube forming a slag notch, suitably watercooled, an enclosed chamber communicating with the outlet of said slag notch this chamber being provided with means for feeding gas, steam or liquid into it, and an opening that can be closed from the outside preferably arranged coaxially with the slag notch and connecting the chamber in front of the slag notch with the open air. All these parts are suitably incorporated in a common casing.

The apparatus can be constructed for continuous or intermittent tapping of the slag. During tapping the slag flows through the slag notch to the chamber adjoining its outlet and the discharge opening in such a way that a liquid, gaseous or vapourous medium envelops the slag jet thus protecting the walls of the opening from being attacked by the slag. The pressure of the fluid medium acting on the liquid slag during its passage from the slag notch to the discharge opening is kept lower than the pressure in the gas producer. By regulating the pressure of this medium the quantity of outflowing slag can be controlled. If the pressure of the medium is considerably lower than that existing in the gas producer there is a great quantity of outflowing slag while with increasing pressure the outflow diminishes. If the outflow of the slag is to be stopped the pressure of the medium acting on the flow is raised to the pressure in the gas producer or even higher and the discharge opening is closed. The slag then recedes into the gas producer. At the same time the fluid medium acting on the slag flow also flows into the producer. This flow is preferably maintained as long as no slag is tapped in order to keep clear the passage from the slag notch to the interior of the gas producer. For starting the tapping of the slag the pressure in front of the slag notch is temporarily increased until the plug closing the discharge opening is removed. Then the pressure is decreased until the slag flows out in the desired quantity.

Figure 2:
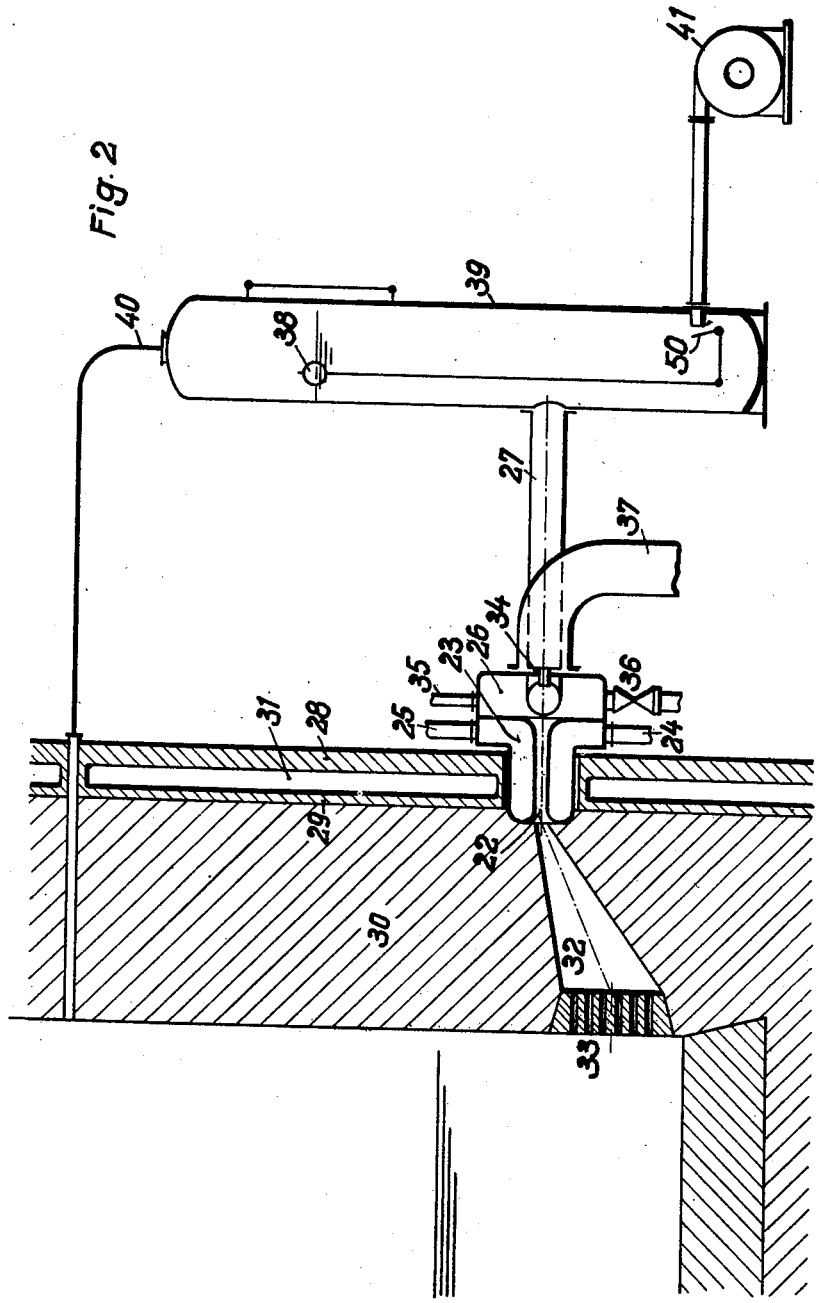
Figure 3:
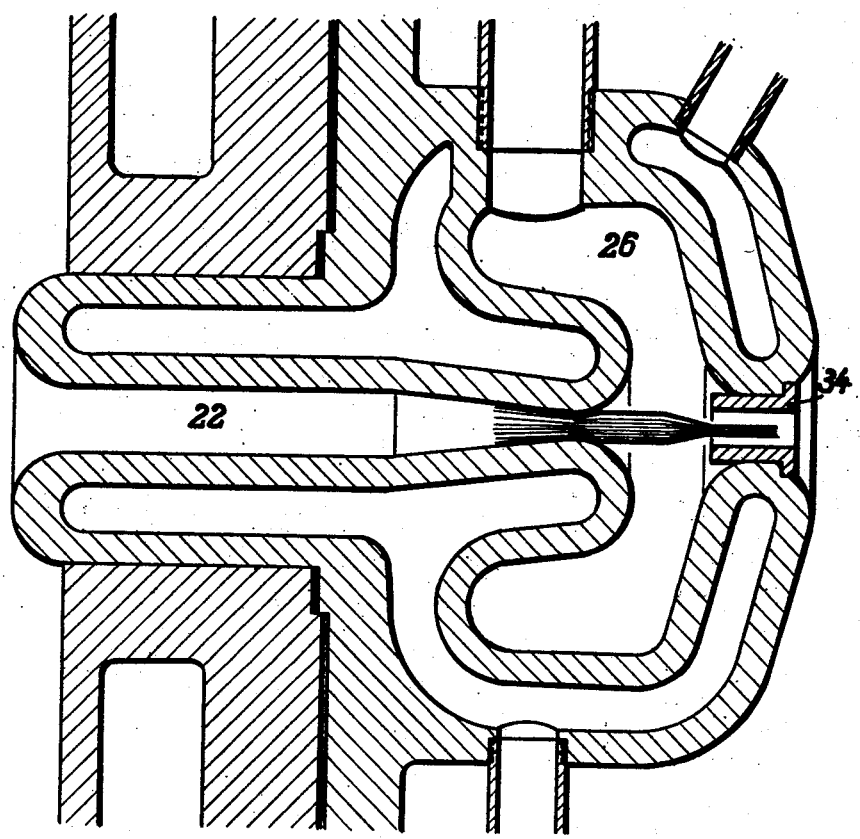
Figure 4:
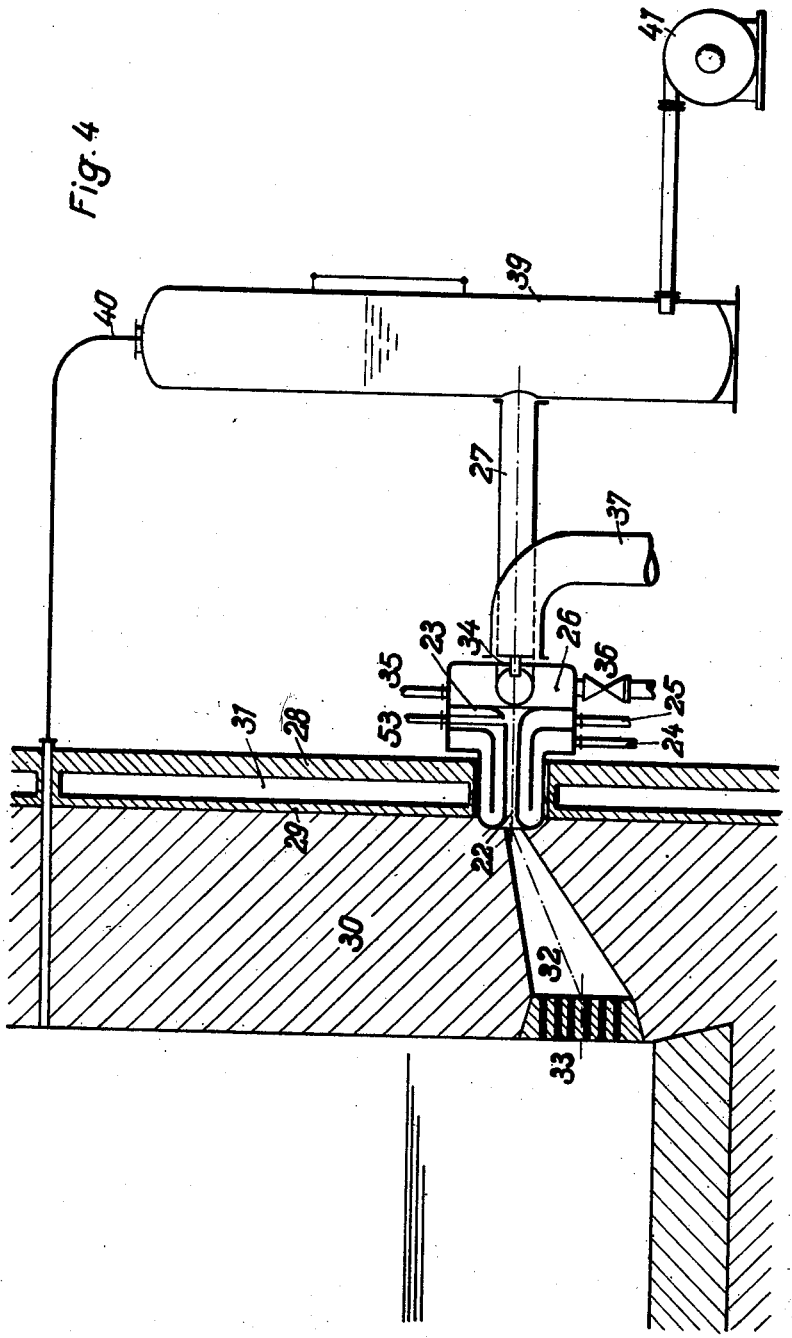

To further illustrate the invention, the accompanying drawings show by way of example in Figs. 1, 2 and 4 three embodiments of the invention in vertical sectional elevations and in Fig. 3 details of the new apparatus.

The casing 1 contains the tube 2 forming the slag notch through which the liquid slag flows out. Notch 2 is surrounded by the cooling water jacket 3 receiving the water through line 4 and discharging it through line 5. Above the notch 2 there is a semi-annular chamber 6 communicating with the chamber 7 in front the outlet of the slag notch 2. Into chamber 7 a gaseous medium as, for example, steam, air, carbon dioxide or the like, is fed under pressure by the pipe 8 and through the chamber 6. The casing 1 is fastened, for example bolted, to the wall of the gas producer. Advantageously this wall consists of a pressure load carrying shell 9, an inner wall 10, and an intermediate space 11 for cooling water. The wall 10 is protected against the influence of the high temperatures in the interior of the gas producer by a refractory lining 12 and by the water cooling. A slab or plate 14 with a number of transverse orifices or, for example, a nozzle bottom is fitted into the preferably conical passage 13 connecting the slag notch 2 with the interior of the gas producer. It serves to prevent the transmission of solid matter from the gas producer into the slag notch. The passage 13 opens into the gas producer preferably at or near the bottom of the latter. The chamber 7 has an opening to the outside, preferably arranged coaxially with the slag notch, which can be closed by means of a conical plug 52 or the like actuated by a system of levers 15.

The apparatus is operated in such a way that a jet of gas or steam or the like is continuously blown through the slag notch 2 and the passage 13 as well as the nozzle plate 14, or the like, into the gas producer as long as no slag is being tapped and the discharge outlet is closed. For slag tapping the pressure of the steam or gas in the chamber 7 is temporarily raised by opening the valves 17 and/or 16. The discharge opening 51 is then opened by means of the lever 15 and the pressure in the chamber 7 sufficiently reduced so that the slag can flow out.

The quantity of outflowing slag can be controlled by regulating the pressure in chamber 7. The slag notch 2 is cooled by water entering at 4 and leaving at 5. In order to stop the tapping of the slag, valves 16 and/or 17 are opened, so as to increase the pressure in chamber 7 to an amount exceeding the pressure prevailing in the gas producer, thus interrupting the flowing of the slag. Then the discharge opening 51 can be tightly closed by the conical plug 52 and the admission of gas or steam to chamber 7 is decreased to the extent necessary for the current operation of the gas producer and for keeping clear the slag notch.

The gaseous or vapourous medium for controlling the flow of the slag or stopping it can be regulated by means of valves 16 and 17 in such a way that one of the valves is constantly adjusted to a minimum admission. The regulation itself is done exclusively by opening or closing the second valve, thus advantageously simplifying the regulation of the gas or steam controlling the flow of the slag.

The apparatus according to Figs. 2, 3 and 4 are preferably suitable for continuous tapping. With these devices the slag notch is also water-cooled, suitably in such a way that the slag notch 22 is surrounded by a jacket 23 receiving the water through line 24 and discharging it through line 25. In the same way the blocking-water chamber 26 arranged in front of the jacket 23 and attached with the latter, is provided with a water inlet 27. The device is attached in the same way as shown in Fig. 1 to the wall of the gas producer this wall consisting of two sheets 28, 29, the lining 30 and the cooling water space 31. The device for slag tapping communicates with the interior of the gas producer through passage 32 which also may be fitted with a nozzle bottom 33 or the like for preventing solid matters from entering the slag notch.

The opening for discharging the slag is shown at 34, and the inlet for the gaseous or vapourous medium to the blocking chamber 26 is shown at 35. A scavenging outlet 36 may be arranged in chamber 26.

During operation the slag flows in a continuous stream through the slag notch 22, the blocking chamber 26 and the discharge opening 34. The slag jet is enveloped and accelerated by a water jet coming from the chamber 26 and passing through the opening 34. The mixture of water and slag which latter has hardened and granulated in the meantime is discharged through line 37. By means of a float 38 in the vessel 39 the water flowing by way of pipe connection 27 from the vessel 39 into the chamber 26 establishes a pressure there that is somewhat lower than the pressure to which the slag in the gas producer is subjected. For this purpose the vessel 39 is connected with the interior of the gas producer by line 40. During normal operation the pressure in the upper part of the gas producer is somewhat lower than that in the lower part due to the resistance the gas encounters during its passage through the charge of the gas producer. Since the gas space of the vessel 39 is connected with the gas producer through the line 40, pressure in the gas space is the same as that at the opening of the line 40 into the gas producer, and consequently the pressure in the gas space of the vessel 39 is lower than that in the slag notch 22 so that the slag can flow out through said slag notch.

The difference between the pressure in the lower part of the gas producer and the pressure in the blocking-water chamber 26 can be changed at will by changing the position of the float 38 which is adjustable regarding the level at which it floats. The quantity of the slag flowing through the slag notch can in this way be controlled and adjusted to the current requirements of operation. The water pressure in slag discharge opening 34 is therefore greater than that in line 40 by an amount corresponding to the column of liquid between the level of opening 34 and the liquid level in vessel 39 as determined by the position of float 38. The water is forced into the vessel 39 by pump 41 and the float 38 regulates also the water supply from said pump by means of the throttle valve 50. In this way a uniform difference between the pressure in the gas producer and the pressure at the outlet of the slag notch is maintained with an unchanged position of the float 38 regarding the level at which it floats. The difference in pressure can, however, be varied by changing the relative position of the float 38.

The process of tapping the slag is illustrated in detail in Fig. 3 showing how the slag emerges from the slag notch 22 and while passing through the blocking-water chamber 26 is constricted with increasing velocity and carried along by the blocking-water completely surrounding the slag jet through the opening 34.

As can easily be understood by referring to Fig 3 the cooling of the slag notch 22 can also be effected by the blocking-water. It is only necessary to leave out the walls between the blocking-water chamber and the water jacket of the slag notch and the separate water supply to the latter.

The blocking-water is discharged by way of line 37. As mentioned before the pressure of the blocking-water in the chamber 26 is kept somewhat lower than the pressure in the slag notch 22 or the pressure in the interior of the gas producer respectively. Consequently with an opened slag notch passage a quantity of slag flows out which can be changed at will by regulating the pressure in chamber 26 by means of the float 38, because according to a well-known law of physics the quantity of outflowing slag is at a given cross-section of the flow proportional to the square root value of the pressure difference at the discharge opening. On this basis the velocity in the slag notch is determined. The annular chamber 26 communicates with the discharge line 37 through the mouth-piece 34. The speed of the slag jet, which in the slag notch 22 is still low on account of the small pressure difference, is considerably increased in the cross-section 34 due to the higher pressure difference;

the jet is constricted and annularly surrounded by the also discharging blocking-water. The quantity of blocking-water may be decreased by choosing a mouthpiece 34 with a coefficient of contraction as small as possible. With the entrance of the hot liquid slag into the chamber 26 a considerable cooling-off takes place combined with granulation of the slag. The quantity of water should preferably be kept enough so that a local formation of steam may be possible but can generally be prevented by not allowing the temperature of the water to rise, for example, above 80 degrees centigrade. This final temperature of the discharging blocking-water together with the also measurable quantity of water supplied are factors by which the quantity of discharge slag can be determined.

If the tapping of the slag is to be interrupted steam or gas can, for example, be fed into chamber 26 by way of line 35. Steam is used that has a higher pressure than the cooling water. The outflow of the slag is hereby interrupted and the discharge opening 34 can be closed by means of known devices as, for example, the plug shown in Fig. 1. The blocking-water supply is cut off and the admission of vapourous or gaseous medium is adjusted in such a way that gas or steam enters the gas producer through passage 32 and the perforated slab 33 or the like in quantities sufficient for keeping clear the slag notch.

The apparatus for continuous slag tapping shown in Fig. 2 can also be operated in another way. The pressure in the blocking-water chamber 26 may be kept at the same height as the pressure in the interior of the upper part of the gas producer as, for example, at the opening of the line 40 into the gas producer, and by letting a line for continuous feeding of gas, air, carbon dioxide or the like discharge into the slag notch 22. When the supply of gas to the passage of the slag notch is stopped the slag flows during the tapping through the passage and the blocking-water chamber and is discharged through opening 34. The quantity of discharged slag is determined by the pressure difference between the blocking-water chamber 26 and the pressure in the lower part of the gas producer, which in turn depends on the pressure of the gasification medium blown into the gas producer, i. e. blast pressure. When the supply of gas or steam to the slag notch is turned on and the pressure is kept lower than the pressure in the lower part of the gas producer the gas flows out with the slag and simultaneously a certain decrease in the quantity of outflowing slag takes place. By increasing the pressure the quantity of outflowing slag can be further decreased until, when the gas pressure becomes equal to or higher than the pressure in the lower part of the gas producer, the discharging of the slag ceases and gas or steam flows also into the gas producer. It is possible, therefore, to control the quantity of tapt slag or interrupt the discharge without running the risk of having blocking-water entering the interior of the gas producer.

Such an arrangement is shown, for example, in Fig. 4. In the apparatus according to Fig. 4 the gaseous agent is fed into the slag notch 22 by way of line 53. In every other respect the apparatus according to the Fig. 4 is the same as the apparatus shown in Fig. 2.

The new apparatus according to the invention can also be used for other purposes where in a similar way liquid or molten reaction products are to be discharged from the interior of a container operating under pressure, such as, for instance, a blast furnace for the production of iron.

What I claim is:

1. A process for tapping liquid slag from a gas producer operating at greater than atmospheric pressure comprising removing said slag through the wall of said producer in the form of a jet stream formed by the pressure within the producer, and surrounding said slag jet stream with a fluid medium before said slag jet stream reaches the atmosphere.

2. A process as in claim 1, further comprising interposing said fluid medium under pressure between said jet stream and the atmosphere to regulate the rate of flow of said jet stream.

3. A process as in claim 2, further comprising intermittently stopping said jet stream flow by increasing the pressure of said fluid medium to greater than the pressure in said gas producer.

4. A process as in claim 1, said fluid medium comprising water, and further comprising the stoppage of said jet stream by substituting a gaseous medium for said water at a pressure to effect a seal between said producer and the atmosphere.

5. A process as in claim 4, further comprising cooling the outlet in the wall of said producer with said water.

6. An apparatus for removing liquid slag from a gas producer operating at greater than atmospheric pressure, comprising a tube having one end insertable through the wall of a gas producer and having its opposite end adapted to project outwardly of the producer wall, said tube constituting a slag notch for removing molten slag from said producer, a jacket surrounding at least the projecting end portion of said tube and having a wall spaced therefrom to form a chamber, an opening in said jacket aligned with and spaced from the projecting end of said tube, and means for closing said opening, and said chamber being adapted to receive a fluid pressure medium between said jacket and said tube in the space between said opening and the projecting end of said tube for regulating the flow of slag through said opening.

7. An apparatus as in claim 6, said jacket further comprising cooling means substantially coextensive with said tube.

8. An apparatus as in claim 6, said means for closing said opening comprising a plug, and means for actuating said plug to open or close said opening.

9. An apparatus as in claim 6, further comprising a pipe line for supplying fluid medium into said chamber, a first valve in said line for regulating the flow of fluid medium therethrough, and a second valve connected to said pipe line in parallel with said first valve for varying the fluid pressure in said space.

10. An apparatus as in claim 6, said means for closing said opening comprising a plug, and further comprising a pipe line for supplying fluid medium into said chamber, a first valve in said line for regulating the pressure of the fluid medium in said space to control the flow of slag through said tube, and a second valve connected in parallel with said first valve for raising the fluid pressure in said chamber to stop the flow of slag prior to inserting or withdrawing said plug from said opening.

11. In a gas producer having a wall, a liquid discharge port in said wall, means for regulating the discharge of slag comprising means in said port for screening out solid material, a tubular means forming a slag notch communicating with said port, a casing enclosing at least the outlet end of said tube and spaced therefrom, a wall of said casing forming a chamber between the outlet end of said tube and said casing, a discharge opening in said casing aligned with said tube, and means for introducing a fluid pressure medium in said chamber for regulating the flow of slag from said tube through said opening.

References Cited in the file of this patent

UNITED STATES PATENTS

| Number | Name | Date |
|---|---|---|
| 1,889,434 | Brosius | Nov. 29, 1932 |
| 2,039,175 | Lindhorst | Apr. 28, 1936 |
| 2,457,083 | Jordan | Dec. 21, 1948 |